(12) United States Patent
Masakado

(10) Patent No.: US 6,424,609 B1
(45) Date of Patent: Jul. 23, 2002

(54) OUTPUT CONTROL DEVICE FOR OPTICAL PICK-UP AND METHOD FOR CONTROLLING OUTPUT OF THE OPTICAL PICK-UP

(76) Inventor: Osamu Masakado, c/o Mitsumi Electric Co., Ltd. of 8-8-2, Kokuryo-cho, Chofu-shi, Tokyo (JP)

( * ) Notice: Subject to any disclaimer, the term of this patent is extended or adjusted under 35 U.S.C. 154(b) by 0 days.

(21) Appl. No.: 09/298,131

(22) Filed: Apr. 23, 1999

(30) Foreign Application Priority Data

Apr. 23, 1998 (JP) ............................................ 10-129584

(51) Int. Cl.⁷ .............................. G11B 7/00; G11B 5/09
(52) U.S. Cl. ................................ 369/53.22; 369/53.37; 369/124.12
(58) Field of Search ...................... 369/44.41, 44.42, 369/124.12, 124.05, 124.03, 53.2, 53.22, 53.37, 59.14, 13.05, 13.26, 13.55, 59.21

(56) References Cited

U.S. PATENT DOCUMENTS

| | | | |
|---|---|---|---|
| 4,855,988 A | 8/1989 | Shinbayashi et al. | ........ 369/116 |
| 5,289,443 A | 2/1994 | Maeda et al. | ............ 369/44.36 |
| 5,790,482 A | 8/1998 | Saga et al. | ..................... 369/13 |
| 5,805,558 A | * 9/1998 | Kimura | ................. 369/124.12 |

FOREIGN PATENT DOCUMENTS

| | | |
|---|---|---|
| EP | 0 508 522 A2 | 3/1992 |
| EP | 0 524 628 A1 | 7/1992 |
| JP | 62-66425 | 9/1995 |
| JP | 8-31092 | 2/1996 |

* cited by examiner

Primary Examiner—Thang V. Tran
(74) Attorney, Agent, or Firm—Patents + TMS, P.C.

(57) ABSTRACT

An output control device for an optical pick-up used in an optical disc drive for reproducing and recording an optical disc is disclosed. The optical pick-up is adapted to project light having a quantity of light of either high level or low level to the optical disc. The output control device includes a photodiode having a plurality of light receiving regions for receiving reflected light from the optical disc and then outputting electrical currents responsive to the quantity of light at the respective light receiving regions; a current-voltage converting circuit having a first current-voltage converting section for converting the currents supplied from the photodiode into voltages through a predetermined amplification factor and a second current-voltage converting section for converting the currents supplied from the photodiode into voltages through a predetermined amplification factor which is lower than that of the first current-voltage converting section; and switches which are adapted to supply the currents from the photodiode to the second current-voltage converting section when the quantity of the reflected light from the optical disc is in the high level.

10 Claims, 11 Drawing Sheets

OUTPUT CONTROL DEVICE FOR OPTICAL PICK-UP AND METHOD FOR CONTROLLING OUTPUT OF THE OPTICAL PICK-UP

BACKGROUND OF THE INVENTION

1. Field of the Invention

The present invention relates to an output control device for an optical pick-up (optical head) used in an optical disc drive and a method for controlling output of the optical pick-up.

2. Description of the Related Art

There are known optical disc drives for reproducing (playing back) a read only optical disc such as a CD-ROM, and for recording and reproducing a recordable optical disc such as CD-R and CD-RW.

Such an optical disc drive has an optical pick-up which is movable in the radial direction of the optical disc, and an optical pick-up moving mechanism equipped with a sled motor for moving the optical pick-up in the radial direction of the optical disc.

The optical pick-up is constructed from an optical pick-up main body (an optical pick-up base) which is equipped with a laser diode, a split photodiode and an I-V amplifier, an objective lens supported by the optical pick-up main body with suspension springs so as to be movable in the radial direction as well as in the rotational axis direction of the optical disc, and an actuator for moving the objective lens in the radial direction and in the rotational axis direction of the optical disc.

In such an optical disc drive, recording of data to the optical disc and reproduction (read-out) of data from the optical disc are carried out for a predetermined track while performing focus control, tracking control and the like.

FIG. 11 is a circuit diagram which shows a split photodiode and I-V amplifiers used in a conventional optical disc drive. As shown in the drawing, a split photodiode 110 is electrically connected to each of I-V amplifiers 121, 122, 123, 124, 125 and 126, respectively.

For recording and reproducing an optical disc, a laser beam is projected toward the optical disc from a laser diode (which are not shown in the drawing).

In this case, when the data is to be reproduced from the optical disc, the output level of the laser beam projected toward the optical disc is set to a reproduction level, and the quantity of reflected light from the optical disc goes to a low level.

On the other hand, when the data is to be written onto the optical disc by forming pits and lands, the output level of the laser beam is controlled as follows. Namely, when the pits are to be formed, the output level of the laser beam is raised to a recording level (about 10 to 30 times the reproduction level), and the quantity of reflected light from the optical disc goes to a high level. On the other hand, when no pits are to be formed (that is, when lands are to be formed), the output level of the laser beam is lowered to the reproduction level, and the quantity of reflected light from the optical disc goes to the low level.

The reflected light from the optical disc (laser beams) is received by light receiving regions 111, 112, 113, 114, 115, and 116 of the split photodiode 110, and currents corresponding to the quantities of received light at respective regions 111 to 116 of the split photodiode 110 are outputted. The currents from the split photodiode 110 are amplified with predetermined amplification factors and converted into voltages by the respective I-V amplifiers 121, 122, 123, 124, 125 and 126, and then inputted into predetermined post stage circuits.

In the case of an optical disc drive which is capable of only performing reproduction of an optical disc, since the output level of the laser beam projected to the optical disc is constant (at the reproduction level) as mentioned above, variations in the currents from the split photodiode 110 are relatively small.

On the other hand, however, in the case of an optical disc drive which is capable of performing both of recording and reproduction of an optical disc, the output level of the laser beam projected to the optical disc when recording is being carried out is about 10 to 30 times that of reproduction as mentioned above. Therefore, there may arise a problem that the dynamic ranges of the I-V amplifiers are insufficient to deal with the currents.

In other words, in the case of an optical disc drive capable of performing both of recording and reproduction, if the amplification factor of respective I-V amplifier is set at a relatively high value so as to be suitable for reproduction and then a current is converted into a voltage for recording by the I-V amplifier having such a setting, the high voltage side of the voltage waveform is likely to be truncated, which may give rise to a situation in which the correct voltage corresponding to the received quantity of light is not obtained. This may also cause an inconvenience in various controls that are to be carried out in the recording operation.

On the other hand, if the amplification factor of the I-V amplifier is set at a relatively low value suitable for recording, the voltage (signal level) outputted from the I-V amplifier becomes too low at reproduction. This may case an inconvenience in various controls that are to be carried out in the re producing operation.

These problems may be resolved by using an I-V amplifier with a relatively wide dynamic range, but it also has certain restrictions.

SUMMARY OF THE INVENTION

Accordingly, it is an object of the present invention to provide an output control device for an optical pick-up which is capable of properly performing recording (including control for recording) and reproduction (including control for reproduction) in an optical disc drive.

In order to achieve the object, the present invention is directed to an output control device for an optical pick-up used in an optical disc drive for recording and reproducing an optical disc, in which the optical pick-up being adapted to project light having a quantity of light of either high level or low level to the optical disc. The output control device comprises light receiving means having a plurality of light receiving regions for receiving reflected light from the optical disc and then outputting electrical currents responsive to the quantity of light received at the respective light receiving regions; current-voltage converting means having a first current-voltage converting section for converting the currents supplied from the light receiving means into voltages through a predetermined amplification factor; and current supply changeover means which functions so as not to supply the currents from the light receiving means to the first current-voltage converting section when the quantity of the reflected light from the optical disc is in the high level.

In the present invention, it is preferred that the current-voltage converting means further comprises a second current-voltage converting section for converting at least a part of the currents supplied from the light receiving means into voltages through a predetermined amplification factor which is lower than that of the first current-voltage converting section, and the current supply changeover means is adapted to supply the part of the currents from the light receiving means to the second current-voltage converting section of the current-voltage converting means when the quantity of the reflected light from the optical disc is in the high level.

According to the output control device for the optical pick-up described above, since a part of the currents from the light receiving means is supplied to the second current-voltage converting section of the current-voltage converting means when the quantity of the reflected light from the optical disc is in the high level, it is possible to prevent insufficiency in the dynamic range of the current-voltage converting means.

In particular, a voltage (signal) with a relatively high level and correctly responsive to the quantity of received light at the light receiving region can be obtained, thereby enabling to perform various controls securely and reliably during the recording and reproduction operations.

In the present invention, it is also preferred that the current supply changeover means comprises main paths for supplying the currents from the light receiving means to the first current-voltage converting means; branch paths which are respectively branched from the main paths at branch portions for supplying the currents from the light receiving means to a part other than the first current-voltage converting section; and selection means for selecting either of the main paths or the branch paths to which the currents from the light receiving means are to be supplied, wherein the selection is made by the selection means so as to supply the currents from the light receiving means to the main paths when the quantity of reflected light from the optical disc is in the low level or so as to supply the currents from the light receiving means to the branch paths when the quantity of reflected light from the optical disc is in the high level.

According to the above configuration, when the output level of the laser beam is at the reproduction level, that is, when the quantity of reflected light from the optical disc is at the low level, the currents from the light receiving means such as a split photodiode flow in the main paths. On the other hand, when the output level of the laser beam is at the recording level, that is, when the quantity of reflected light from the optical disc is at the high level, the currents flow in the branch paths branched from the main paths via branch points. Therefore, it is possible to avoid the situation in which the dynamic ranges of the first current-voltage converting circuits are insufficiently narrow.

Further, it is more preferable that the branch paths include a first path connected to the second current-voltage converting section and a second path connected to a part other than the first and second current-voltage converting sections, and the currents from the light receiving means corresponding to the main beam reflected from the optical disc are adapted to be supplied to the second current-voltage convert in section through the first path when the quantity of light reflected from the optical disc is in the high level.

Furthermore, it is also preferred that the currents from the light receiving means corresponding to the sub-beams reflected from the optical disc are adapted to be outputted from the current-voltage converting means through the second path without passing through the first and second current-voltage converting sections.

In the present invention, it is preferred that the selection means is constructed from a plurality of switches, and each of the switches is provided at each of the branch portions for selectively switching between the conducting state of the light receiving means and each of the main paths at the respective branch portions and the conducting state of the light receiving means and each of the branch paths at the respective branch portions.

Further, it is also preferred that the output control device further comprises a sample-and-hold circuit for holding voltages from the first current-voltage converting section when the quantity of light reflected from the optical disc is in the high level.

When such a sample-and-hold circuit which is capable of holding the voltages from the first current-voltage converting section is provided, it is possible to more surely and reliably perform the controls during the recording and reproduction operations.

Furthermore, in the present invention, it is also preferred that the light receiving means, the current-voltage converting means and the current supply changeover means are integrally formed into a single unit. In this case, the number of part items can be reduced, and hence its assembly to the optical disc drive 1 can be facilitated.

Another aspect of the present invention is directed to a method for controlling output of an optical pick-up used in an optical disc drive for recording and reproducing an optical disc, the optical pick-up being adapted to project light having a quantity of light of either high level or low level to the optical disc. The method comprises the steps of: receiving light reflected from the optical disc by light receiving means having a plurality of light receiving regions and then outputting electrical currents responsive to the quantity of reflected light at the respective light receiving regions; and supplying the currents from the light receiving means to a first current-voltage converting section having a predetermined amplification factor when the quantity of light reflected from the optical disc is in the low level, while supplying the currents from the light receiving means to a second current-voltage converting section having a predetermined amplification facto which is lower than that of the first current-voltage converting section without supplying them to the first current-voltage converting section when the quantity of light reflected from the optical disc is in the high level.

In this method, it is preferred that the currents from the light receiving means are supplied to the first current-voltage converting section when lands are to be formed during recording to the optical disc, while the currents from the light receiving means are supplied to the second current-voltage converting section without supplying them to the first current-voltage converting section when pits are to be formed during the recording to the optical disc.

In this case, it is preferred that the currents from the light receiving means corresponding to the main beam reflected from the optical disc are adapted to be supplied to the second current-voltage converting section when the quantity of light reflected from the optical disc is in the high level. Further, it is more preferable that the currents from the light receiving means corresponding to the sub-beams reflected from the optical disc are adapted to be outputted from the current-voltage converting means without passing through the first and second current-voltage converting sections.

Other objects, structures and results of the present invention will be apparent when the following description of the preferred embodiments are considered taken in conjunction with the accompanying drawings.

THE DETAILED DESCRIPTION OF THE PREFERRED EMBODIMENTS

In the following, an output control circuit (output control device) for an optical pick-up according to the present invention will be described in detail based on the preferred embodiments shown in the accompanying drawings.

Figure 1:
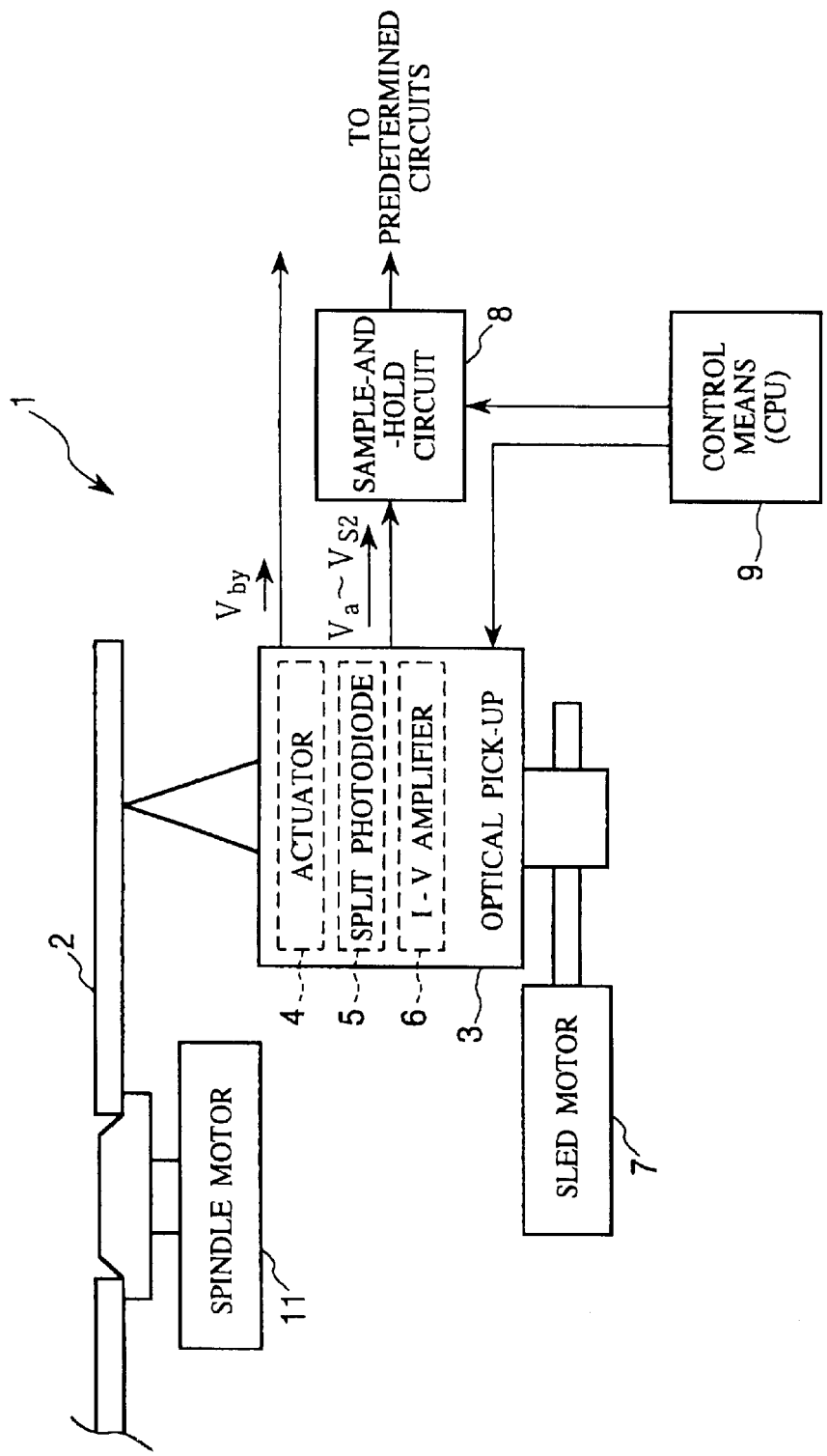
FIG. 1 is a block diagram which shows an example of a structure of an optical disc drive equipped with an output control device for an optical pick-up used in an optical disc drive according to the present invention.

FIG. 1 is a block diagram showing an example (a main part only) of an optical disc drive provided with the output control device (circuit) for the optical pick-up according to this invention.

The optical disc drive 1 shown in FIG. 1 is a CD-R drive for performing recording and reproduction of an optical disc (CD-R) 2.

In the optical disc 2, there is formed a spiral pre-groove (wobble) which is not shown in the drawing.

The pre-groove is recorded with an absolute time in pre-groove (ATIP) information which is time information, and meanders with a prescribed period (22.05 kHz for the basic speed).

The pre-groove functions as a guide groove at the time of formation of pits and lands (performing recording operation) on the optical disc 2. The pre-groove is utilized for controlling the rotation speed of the optical disc 2 and specifying the recording position (absolute time) on the optical disc 2, and the like.

The optical disc drive 1 is provided with a turntable and a spindle motor 11 for rotating the turntable, and has a rotation drive mechanism, not shown, for loading the optical disc 2 on the turntable and rotating it.

In addition, the optical disc drive 1 includes an optical pick-up (optical head) 3 which can move in the radial direction of the loaded optical disc 2 (radial direction of the turntable), an optical pick-up moving mechanism equipped with a sled motor 7 for moving the optical pick-up 3 in the radial direction, a sample-and-hold circuit (holding circuit) 8, a control means 9 and a casing (not shown in the drawing) for accommodating these components. In the following, the radial direction of the optical disc 2 will simply be referred to as "radial direction".

The optical pick-up 3 includes an optical pick-up main body (optical pick-up base) which is provided with a laser diode as a light source (not shown), a split photodiode as a light receiving part 5 and an I-V amplifier 6, and an objective lens as a focusing lens (not shown). The split photodiode 5 and the I-V amplifier 6 will be described later in more detail.

The objective lens is supported by suspension springs (not shown) provided on the optical pick-up main body such that it can be moved in each of the radial direction and the direction of the rotational axis of the optical disc 2 (turntable). If the objective lens deviates from its neutral position (midpoint), the objective lens is adapted to be returned toward the neutral position by the restoring force of the suspension springs. In the following, the direction of the rotational axis of the optical disc 2 will simply be referred to as the rotational axis direction.

The optical pick-up 3 also has an actuator 4 which moves the objective lens, in resistance to the restoring force of the suspension springs, in each of the radial direction and the rotational axis direction with respect to the optical pick-up main body.

A control means 9 is normally composed of a microcomputer (CPU), and controls various components and circuits of the optical disc drive 1 such as the optical pick-up 3 (actuator 4, laser diode and the like), the sled motor 7, the spindle motor 11 and the sample-and-hold circuit 8 and the like.

An external device (for example, a personal computer) is connected to the optical disc drive 1 in a freely disconnectable manner via an interface, thereby permitting communication of the optical disc drive 1 with the external device.

Figure 2:
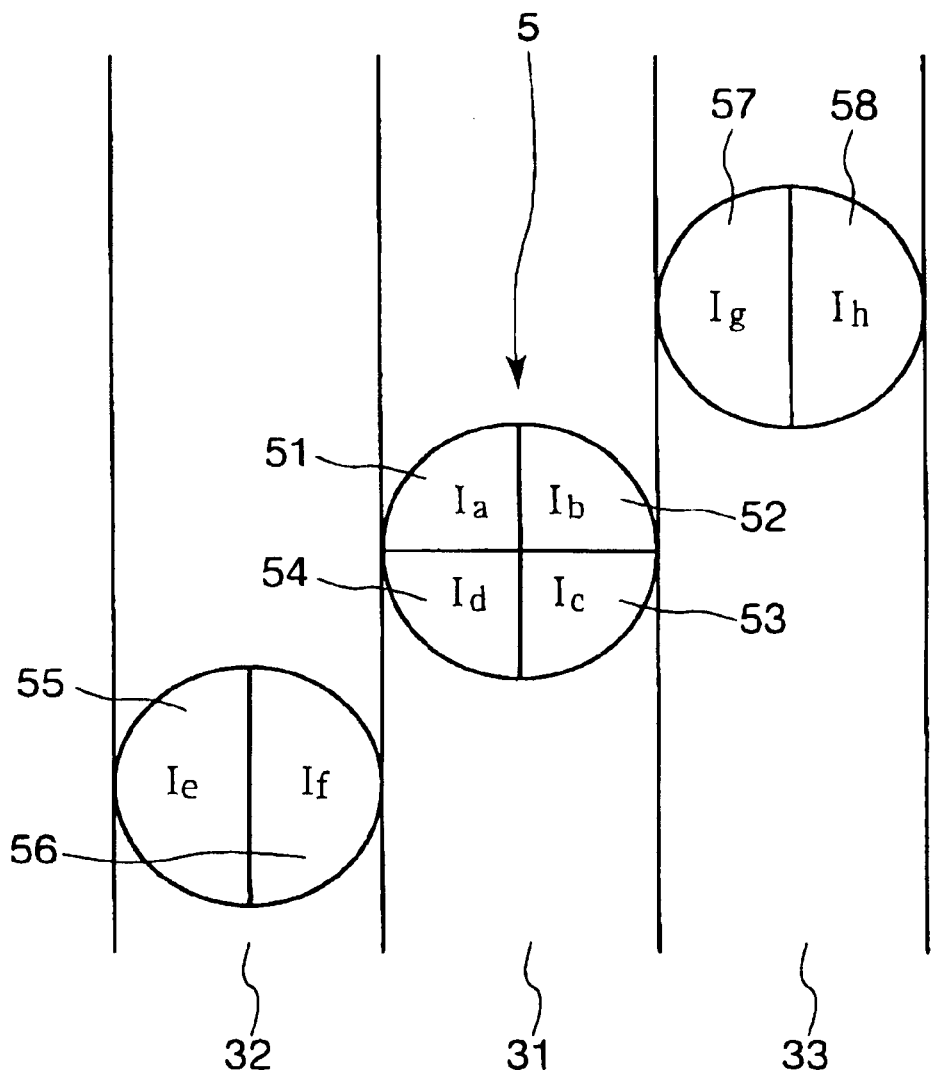
FIG. 2 is an illustration which shows positional relationship between the split photodiode and the reflected light of the laser beam which has been projected toward an optical disc and then reflected therefrom.
Figure 3:
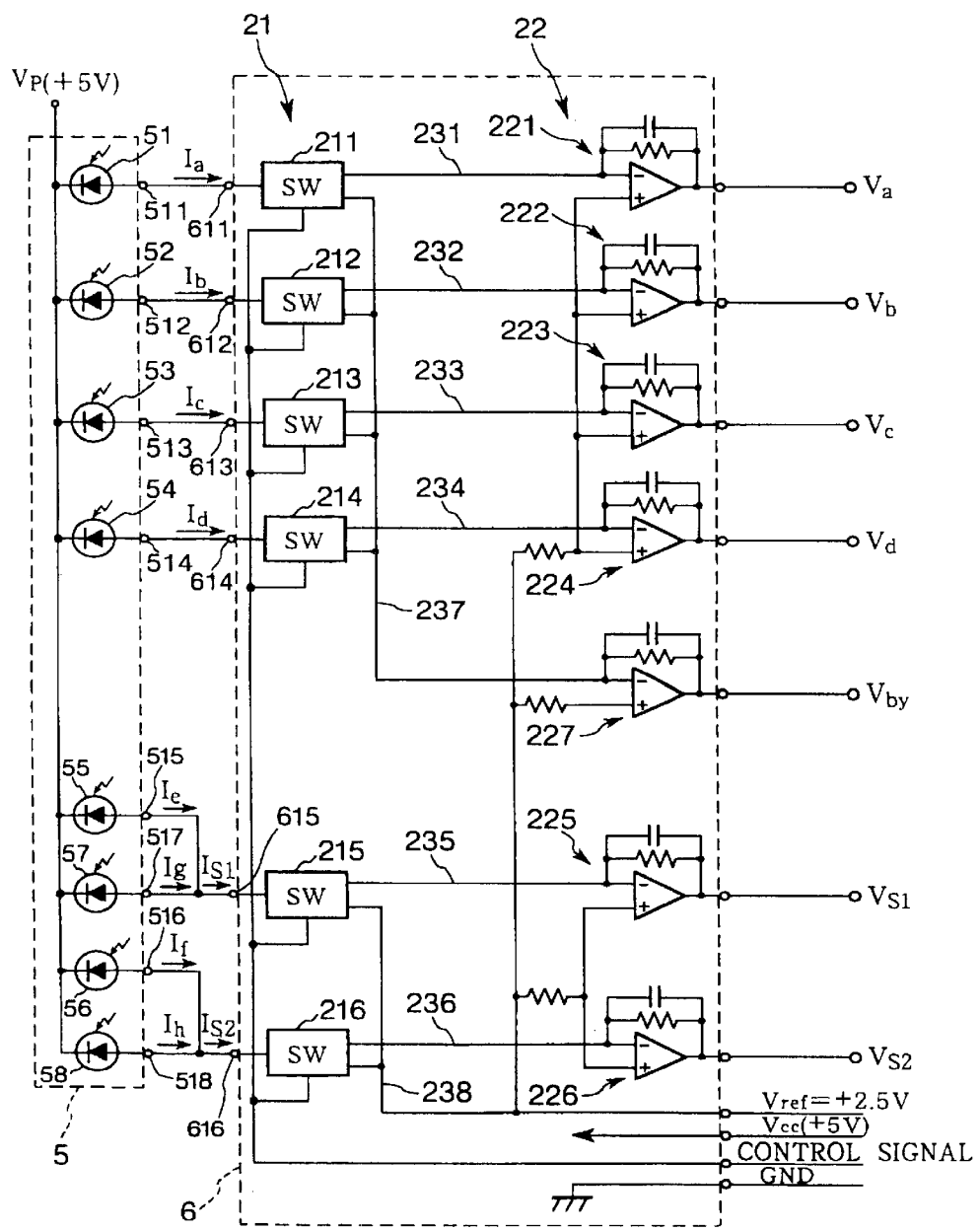
FIG. 3 is a circuit diagram of a first embodiment of the output control device for the optical-pick up according to the present invention.

FIG. 2 is a schematic diagram showing the positional relationship between the reflected beams of the laser beam which has been projected to the optical disc 2 and the split photodiode 5 during recording or reproducing operation. FIG. 3 is a circuit diagram showing a first embodiment of the output control device for the optical pick-up according to this invention.

As shown in these drawings, this optical disc drive 1 adopts the differential push pull (DPP) system f or the optical pick-up. Therefore, when recording or reproduction is carried out, a main beam is projected to a pre-groove 31 formed on the optical disc 2, one of the two sub-beams is projected to one of the lands 32 adjacent to the pre-groove 31, and the other sub-beam is projected to the other land 33 adjacent to the pre-groove 31.

The split photodiode 5 has four light receiving regions 51 52, 53, and 54 which receive the reflected light of the main beam which has been projected to the optical disc 2, two light receiving regions 55 and 56 which receive the reflected light of one of the two sub-beams, and light receiving regions 57 and 58 which receive the reflected light of the other of the two sub-beams. In the thus constructed photodiodes, the currents Ia, Ib, Ic, Id, Ie, If, Ig and Ih corresponding to the quantities of received light at respective light receiving regions 51, 52, 53, 54, 55, 56, 57 and 58 are outputted from output terminals 511, 512, 513, 514, 515, 1516, 517 and 518, respectively.

In this regard, it is to be noted that a voltage Vp of a prescribed level (for example +5V) is applied to the cathode of each diode of the split photodiode 5.

The I-V amplifier 6 is a device in which a switch part (current supply changeover means) 21 and a current-voltage converting means 22 are integrally provided. In this case, the switch part 21 is provided on the input side, and the current-voltage converting means 22 is provided on the output side.

The switch part 21 is constructed from six changeover switches 211, 212, 213, 214, 215 and 216, and each changeover switch 211 to 216 is composed of an analog switch, for example. The operation of each of the switches 211 to 216 is controlled by a control signal from the control means 9.

The current-voltage converting means 22 is composed of a first current-voltage converting and amplifying section having six circuits (first current-voltage converting circuits) 221, 222, 223, 224, 225 and 226, and a second current-voltage converting and amplifying section (second current-voltage converting circuit) 227. In the following, the first and second current-voltage converting and amplifying sections will simply be referred to as "current-voltage converting section", respectively.

Each of the current-voltage converting circuits 221 to 227 is composed of a differential amplifier equipped with an operational amplifier.

A reference voltage $V_{ref}$ (for example, +2.5V) of a predetermined level is applied to the non-inverting input terminal of each of the current-voltage converting circuits 221 to 227.

Various conditions such as the amplification factor of each of the current-voltage converting circuits 221 to 226 are set so as to be able to convert the current outputted from the corresponding output terminal (light receiving region) of the split photodiode 5 to a necessary and sufficient level of voltage when the output level of the laser beam being projected to the optical disc 2 is in the reproduction level (low level), namely, when the quantity of reflected light from the optical disc 2 is at the low level.

In this case, since the output level of the laser beam being projected to the optical disc 2 is in the reproduction level, namely, the quantity of reflected light from the optical disc 2 is at the low level, the dynamic range of the current-voltage converting circuits 221 to 226 is sufficiently wide for the operation.

Further, in the same manner as the current-voltage converting circuits 221 to 226, conditions such as the amplification factor of the current-voltage conversion circuit 227 are set so as to be able to convert the current outputted from the corresponding output terminal (light receiving region) of the split photodiode 5 to a corresponding voltage correctly (so as to have sufficiently wide dynamic range) when the output level of the laser beam projected to the optical disc 2 is in the recording level (high level), namely, when the quantity of reflected light from the optical disc 2 is at the high level.

In this case, since the output level of the laser beam being projected to the optical disc 2 is in the recording level, namely, the quantity of reflected light from the optical disc 2 is at the high level, it is possible to convert the current outputted from the corresponding output terminal (light receiving region) of the split photodiode 5 to a voltage of necessary and sufficient level.

The amplification factor of the current-voltage converting section 227 is set to be smaller than the amplification factor of the current-voltage converting circuits 221 to 226.

A power supply (power circuit) which is not shown in the drawing supplies a power with voltage of $V_{cc}$ (for example, +5V) to the I-V amplifier 6.

In this embodiment, the I-V amplifier 6 and the sample-and-hold circuit 8 constitute an output control device of an optical pick-up according of the present invention.

Next, the operation of the optical disc drive 1 will be described.

The optical disc drive 1 carries out recording (writing) and reproduction (reading) of data to and from the optical disc 2 while performing focus control, tracking control, sled control and rotation number control (rotational speed control) and the like.

First, the overall operating of the optical disc drive 1 at recording or reproduction will be described briefly, then the operation of the output control circuit of the optical pick-up will be described.

When recording is to be carried out, the pre-groove formed in the optical disc 2 is reproduced (read out), and then data (signals) are recorded along the pre-groove.

When data (signals) to be recorded onto the optical disc 2 are inputted via an interface (not shown), the data are encoded and modulated according to a method so called as eight to fourteen modulation (EFM) to be converted into ENCODE EFM signals.

The control means 9 controls the operation of the laser diode of the optical pick-up 3 based on the ENCODE EFM signals.

More specifically, the control means 9 controls the output level of the laser beam so as to be at the recording level during the period when the level of the ENCODE EFM signal is at high level (Hi), and controls the output level of the laser beam so as to be at the reproduction level during the period when the level of the ENCODE EFM signal is at low level (Lo).

With this arrangement, a pit with a predetermined length is written to the optical disc 2 when the ENCODE EFM signal is at the high level (Hi), and no pit is written (a land with a predetermined length is formed) to the optical disc 2 when the ENCODE EFM signal is at the low level (Lo). In this way, data are written to (recorded in) a specified track of the optical disc 2.

When the written data is to be reproduced, the control means 9 controls the operation of the laser diode of the optical pick-up 3 so as to bring the output level of the laser beam to the reproduction level (low level).

Then, a laser beam of the reproduction level is projected from the laser diode of the optical pick-up 3 to the specified track of the optical disc 2. The laser beam is reflected by the optical disc 2 and then the reflected light is received by the split photodiode 5 of the optical pick-up 3.

Currents corresponding to the quantities of received light are outputted from the split photodiode 5. Then, the currents are converted into voltages and amplified according to a prescribed amplification factor by the I-V amplifier 6, and then thus converted voltages are outputted from the optical pick-up 3.

By performing addition and amplification of the detected signals, that is, the voltages outputted from the optical pick-up 3, HF (RF) signals are generated. These HF signals are analog signals responsive to the pits and lands written onto the optical disc 2.

These HF signals are digitized and EFM demodulated, and then decoded (converted) to data (data signals) of predetermined format.

These data signals are then decoded to data of predetermined format for communication (transmission), and are transmitted to an external device such as a personal computer via the interface which is not shown.

Next, the operation of the output control device for the optical pick-up of this embodiment will be described.

When data is to be recorded or reproduced, a laser beam is projected to the optical disc 2 as mentioned above. Namely, as shown in FIG. 2, the pre-groove 31 is irradiated with the main beam, one land 32 is irradiated with one of the sub-beams of the two sub-beams, and the other land 33 is irradiated with the other sub-beam.

The main beam is reflected by the pre-groove 31. The reflected light is received by the light receiving regions 51, 52, 53 and 54 of the split photodiode 5, and the currents Ia, Ib, Ic and Id corresponding to the quantities of received light at the light receiving regions 51, 52, 53 and 54 are outputted from output terminals 511, 512, 513 and 514, respectively.

One of the sub-beams is reflected by the land 32. The reflected light is received by the light receiving regions 55 and 56 of the split photodiode 5, and currents Ie and If corresponding to the quantities of received light at the light receiving regions 55 and 56 are outputted from output terminals 515 and 516, respectively.

The other sub-beam is reflected by the land 33. The reflected light is received by the light receiving regions 57 and 58 of the split photodiode 5, and currents Ig and Ih corresponding to the quantities of received light at the light receiving regions 57 and 58 are outputted from outputted terminals 517 and 518, respectively.

The currents Ia, Ib, Ic and Id are inputted to the I-V amplifier 6 through input terminals 611, 612, 613 and 614, respectively.

The currents Ie and Ig are summed to $Is_1$, and it is inputted to the I-V amplifier 6 through an input terminal 615.

In addition, the currents If and Ih are summed to $Is_2$, and it is inputted to the I-V amplifier 6 through an input terminal 616.

Figure 4:
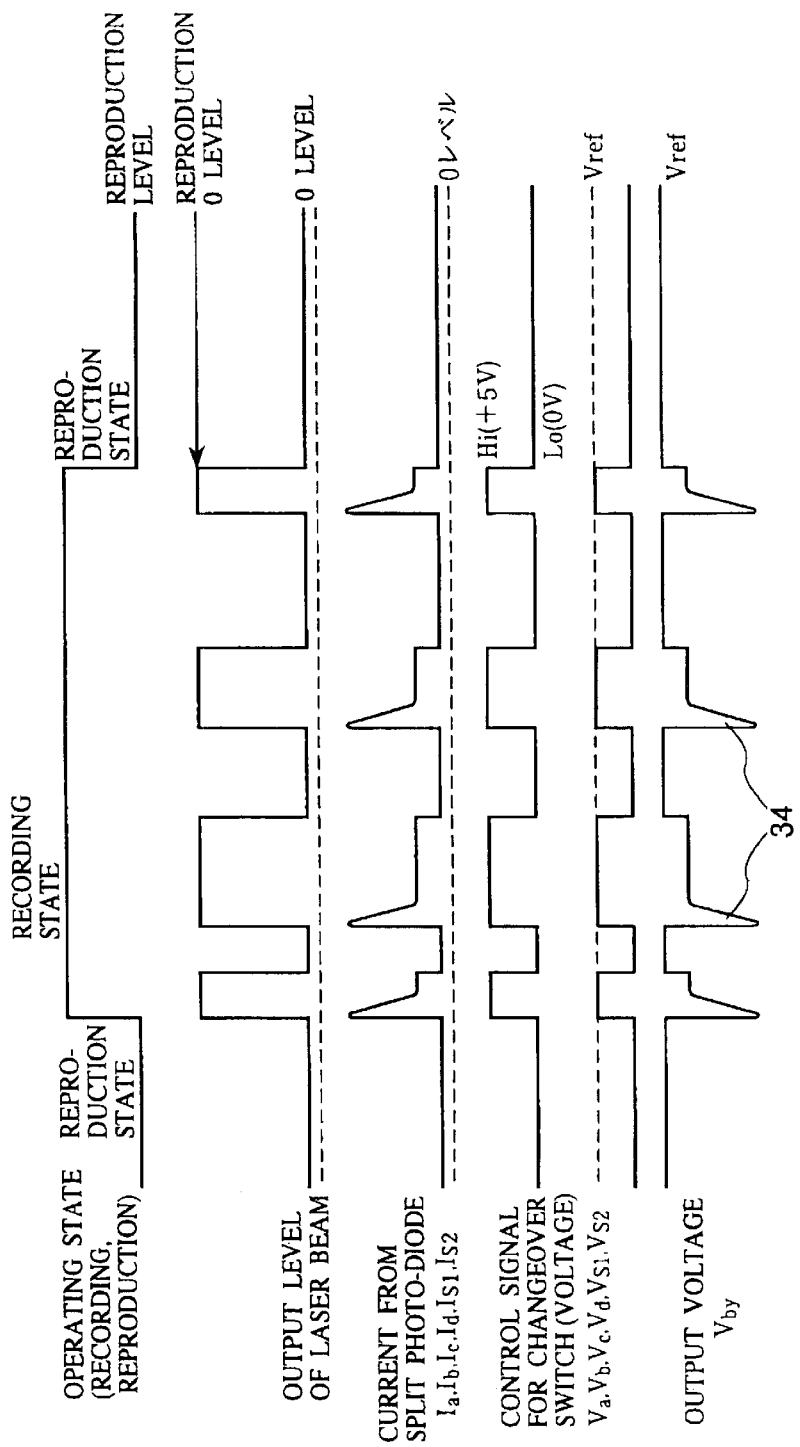
FIG. 4 is a timing chart which shows operating state of the optical disc drive of the according to the present invention and various signals relating thereto.
Figure 5:
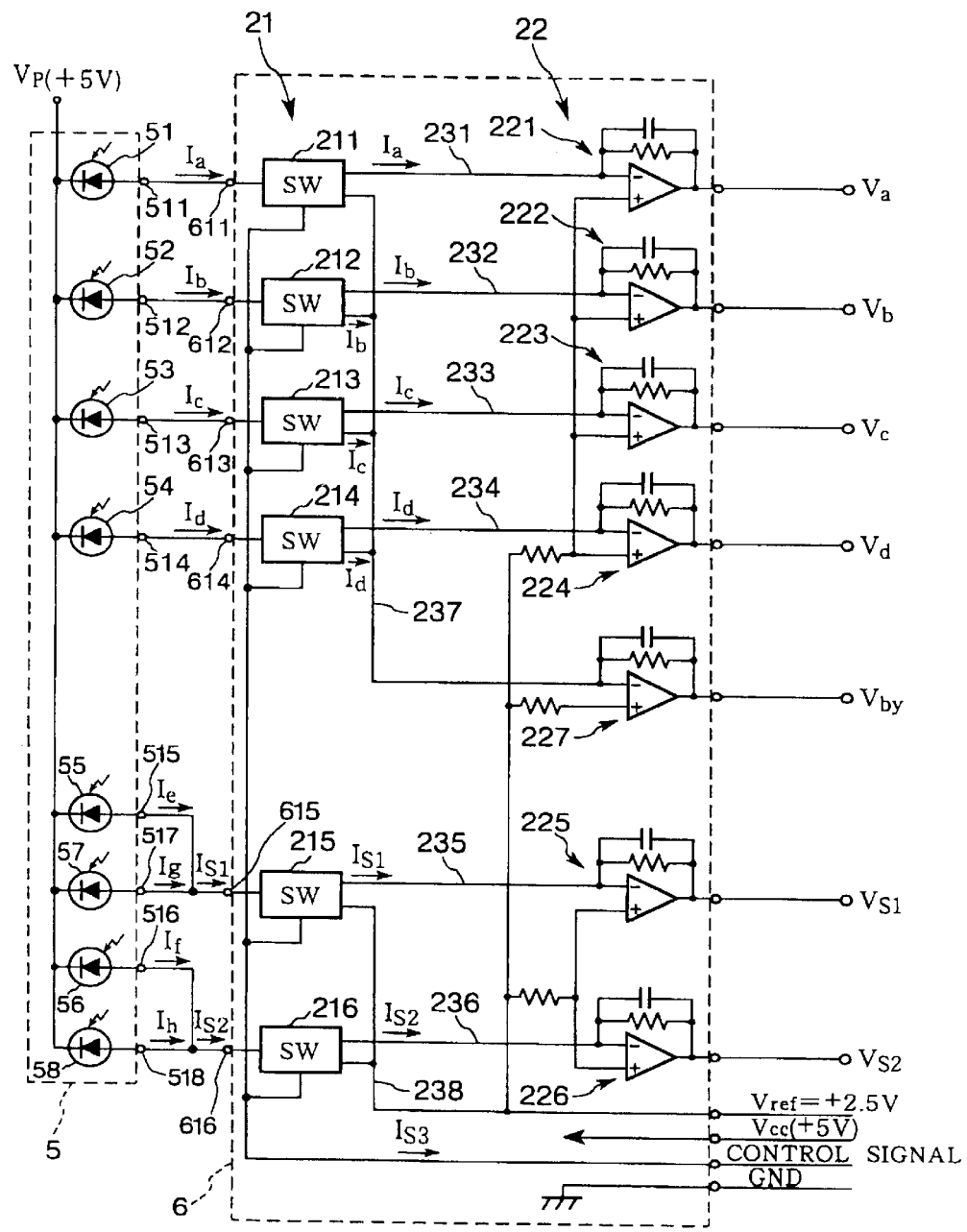
FIG. 5 is a circuit diagram which shows the operation state of the output control device for the optical pick-up shown in FIG. 3 where the output level of the laser beam being projected to the optical disc is in the reproduction level.
Figure 6:
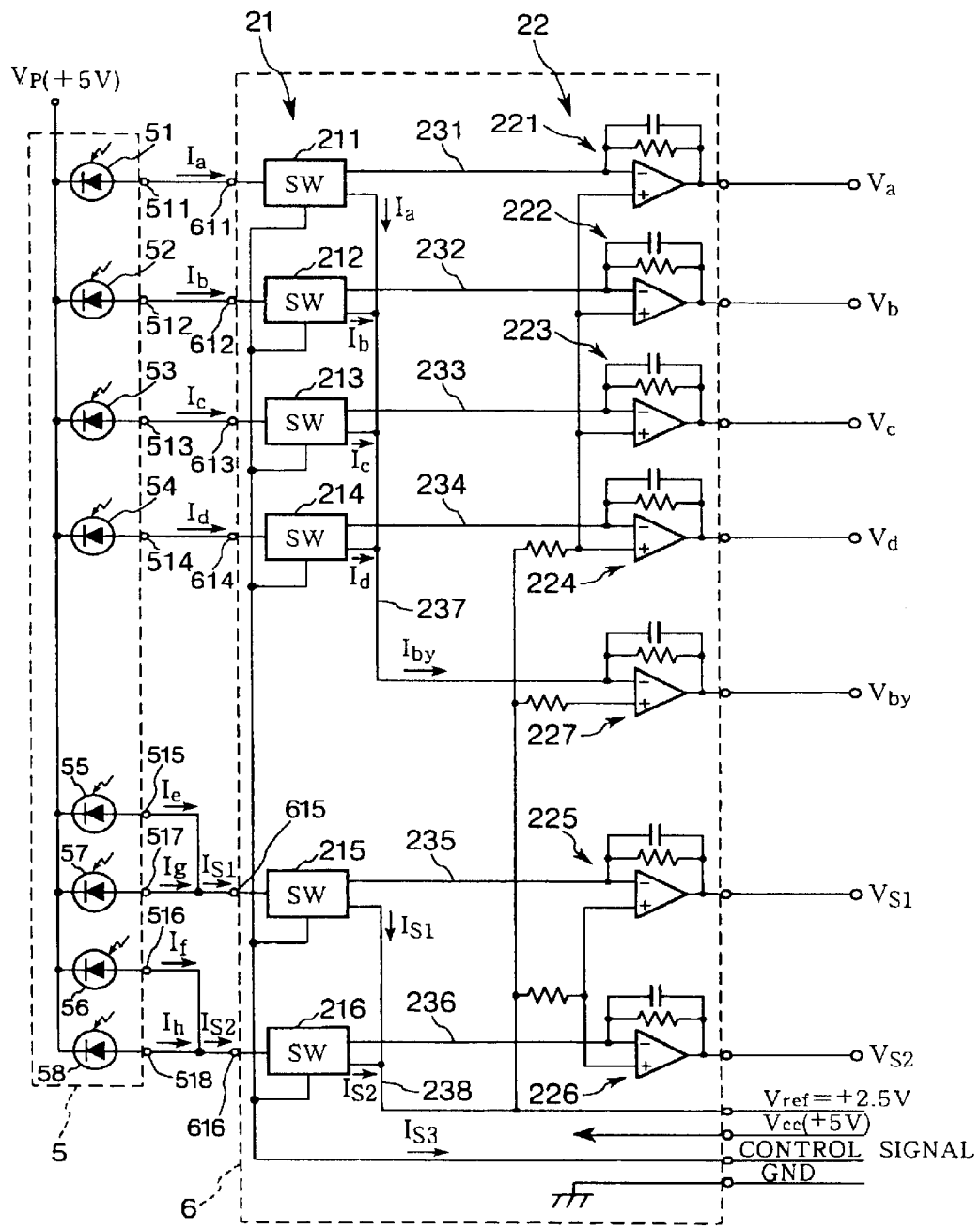
FIG. 6 is a circuit diagram which shows the operating state of the output control device for the optical pick-up shown in FIG. 3 where the output level of the laser beam being projected to the optical disc is in the recording level.

FIG. 4 is a timing chart showing the operating states and the signals of various kinds of the optical disc drive 1; FIG. 5 is a circuit diagram showing the state of the output control device for the optical pick-up shown in FIG. 3 when the output level of the laser beam being projected to the optical disc 2 is in the reproduction level; and FIG. 6 is a circuit diagram showing the state of the output control device for the optical pick-up shown in FIG. 3 when the output level of the laser beam being projected to the optical disc 2 is in the recording level.

When data is to be reproduced, namely, when the operating state of the optical disc drive 1 is in the reproduction state, as shown in FIG. 4, the output level of the laser beam being projected to the optical disc 2 is in the reproduction level as mentioned above.

In this case, the quantity of reflected light from the optical disc 2 goes to the low level, and the currents Ia, Ib, Ic, Id, $Is_1$ (=Ie+Ig) and $Is_2$ (=If+Ih) are respectively at the low levels, as shown in FIG. 4.

In addition, the control means 9 changes over the level of the control signal (voltage) for the changeover switches to the low level.

As a result, the changeover switches 211 to 216 are switched so that an input terminal 611 (the output terminal 511) and a main path 231, an input terminal 612 (the output terminal 512) and a main path 232, an input terminal 613 (the input terminal 513) and a main path 233, an input terminal 614 (the output terminal 514) and a main path 234, an input terminal 615 (the output terminals 515 and 517) and a main path 235, and an input terminal 616 (the output terminals 516 and 518) and a main path 236 are in conductive state, respectively, and the input terminal 611 (the output terminal 511) and a branch path (bypass) 237, the input terminal 612 (the output terminal 512) and the branch path 237, the input terminal 613 (the output terminal 513) and the branch path 237, the input terminal 614 (the output terminal 514) and the branch path 237, the input terminal 615 (the output terminals 515 and 517) and a branch path (bypass) 238, and the input terminal 616 (the output terminals 516 and 518) and the branch path 238 are in nonconductive state, respectively, as shown in FIG. 5.

In this state, the currents Ia to $Is_2$ are inputted to the current-voltage converting circuits 221 to 226 through the main paths 231 to 236, respectively.

More specifically, the currents Ia, Ib, Ic, Id, $Is_1$ and $Is_2$ are converted at the current-voltage converting circuits 221, 222, 223, 224, 225 and 226, into voltages Va, Vb, Vc, Vd, $Vs_1$ and $Vs_2$, respectively, in response to the feedback resistors (feedback resistances) of the current-voltage converting circuits 221 to 226 with a reference voltage $V_{ref}$ as the reference.

Thus obtained voltages Va to $Vs_2$ are outputted respectively from the I-V amplifier 6, that is, from the optical pick-up 3.

In this connection, it is to be noted that since the input terminal 611 and the branch path 237. the input terminal 612 and the branch path 237, the input terminal 613 and the branch path 237, the input terminal 614 and the branch path 237, the input terminal 615 and the branch path 238, and the input terminal 616 and the branch path 238 are respectively in nonconductive state, no current flows in the branch paths 237 and 238.

As shown in FIG. 1, the voltages Va to $Vs_2$ are respectively inputted into the sample-and-hold circuit 8 from the optical pick-up 3, but these voltages merely pass through the circuit 8 to be sent to the prescribed circuits.

Moreover, when data is to be recorded, namely, when the operating state of the optical disc drive 1 is in the recording state, as shown in FIG. 4, the output level of the laser beam being projected to the optical disc 2 is switched alternately between the recording level for forming pits and the reproduction level for forming lands in response to the data to be recorded in the optical disc 2, as mentioned above.

When the operating state of the optical disc drive 1 is in the recording state and the output level of the laser beam being projected to the optical disc 2 is in the recording level for forming a pit, the quantity of reflected light from the optical disc 2 goes to the high level, and the currents Ia, Ib, Ic, Id, $Is_1$ and $Is_2$ respectively go to the high level as shown in FIG. 4.

Moreover, the control means 9 switches the level of the control signal (voltage) of the changeover switch to the high level (Hi).

In this way, the changeover switches 211 to 216 are switched so that the input terminal 611 (the output terminal 511) and the main path 231, the input terminal 612 (the output terminal 512) and the main path 232, the input terminal 613 (the input terminal 513) and the main path 233, the input terminal 614 (the output terminal 514) and the main path 234, the input terminal 615 (the output terminals 515 and 517) and the main path 235, the input terminal 616 (the output terminals 516 and 518) and the main path 236 are in nonconductive state, respectively, and the input terminal 611 (the output terminal 511) and the branch path 237, the input terminal 612 (the output terminal 512) and the branch path 237, the input terminal 613 (the output terminal 513) and the branch path 237, the input terminal 614 (the output terminal 514) and the branch path 237, the input terminal 615 (the output terminals 515 and 517)and the branch path 238, and the input terminal 616 (the output terminals 516 and 518) and the branch path 238 are in conductive state, respectively, as shown in FIG. 6.

As a result, the currents Ia, Ib, Ic and Id are summed to $I_{by}$, and it is inputted to a current-voltage converting circuit 227 through the branch path 237.

The current $I_{by}$ is converted into a voltage $V_{by}$ in the current-voltage converting circuit 227 in response to the feedback resistor (feedback resistance) of the converting circuit 227 with the reference voltage $V_{ref}$ as the reference.

The current $V_{by}$ is then outputted from the I-V amplifier 6, that is, from the optical pick-up 3. Moreover, the currents $Is_1$ and $Is_2$ are summed to $Is_3$, and it is outputted to the circuit for applying the reference voltage $V_{ref}$ from the I-V amplifier, that is from the optical pick-up 3, through the branch path 238.

In this case, since the input terminal 611 and the main path 231, the input terminal 612 and the main path 232, the input terminal 613 and the main path 233, the input terminal 614 and the main path 234, the input terminal 615 and the main path 235, and the input terminal 616 and the main path 236 are each in nonconductive state, no current flows in the main paths 231 to 236.

As shown in FIG. 1, the voltage $V_{by}$ outputted from the optical pick-up 3 is sent to a predetermined circuit.

When the optical disc drive 1 is in the recording state and the output of the laser beam irradiating the optical disc 2 goes to the reproduction level for forming a land, the quantity of reflected light from the optical disc 2 goes to the low level, and the currents Ia, Ib, Ic, Id, $Is_1$ and $Is_2$ respectively go to the low level as shown in FIG. 4.

At that time, the control means 9 switches the level of the control signals (voltages) of the changeover switches to the low level (Lo).

As a result, respective changeover switches 211 to 216 are switched so that the input terminal 611 (the output terminal 511) and the main path 231, the input terminal 612 (the output terminal 512) and the main path 232, the input terminal 613 (the output terminal 513) and the main path 233, the input terminal 614 (the output terminal 514) and the main path 234, the input terminal 615 (the output terminals 515 and 517) and the main path 235, the input terminal 616 (the output terminals 516 and 518) and the main path 236 are in conductive state, respectively, and the input terminal 611 (the output terminal 511) and the branch path 237, the input terminal 612 (the output terminal 512) and the branch path 237, the input terminal 613 (the output terminal 513) and the branch path 237, the input terminal 614 (the output terminal 514) and the branch path 237, the input terminal 615 (the output terminals 515 and 517) and the branch path 238, and the input terminal 616 (the output terminals 516 and 518) and the branch path 238 are in nonconductive state, respectively, as shown in FIG. 5.

As a result, the currents Ia to $Is_2$ are inputted to the current-voltage converting circuits 221 to 226 through the main paths 231 to 236, respectively.

More specifically, the currents Ia, Ib, Ic, Id, $Is_1$ and $Is_2$ are converted into voltages Va, Vb, Vc, Vd, $Vs_1$ and $Vs_2$ in the current-voltage conversion parts 221, 222, 223, 224, 225 and 226, respectively, in response to the feedback resistors (feedback resistances) with the reference voltage $V_{ref}$ as the reference.

The voltages Va to $Vs_2$ are outputted respectively from the I-V amplifier 6, that is, from the optical pick-up 3.

In this case, since the input terminal 611 and the branch path 237, the input terminal 612 and the branch path 237, the input terminal 613 and the branch path 237, the input terminal 614 and the branch path 237, the input terminal 615 and the branch path 238, and the input terminal 616 and the branch path 238 are respectively in nonconductive state, no current flows in the branch paths 237 and 238.

As shown in FIG. 1, the voltages Va to $Vs_2$ are respectively inputted from the optical pick-up 3 to the sample-and-hold circuit 8, but these voltages simply pass through the circuit 8 to be sent to prescribed circuits.

Next, when the optical disc drive 1 is in the recording state and the output level of the laser beam goes to the recording level again for forming a pit, the quantity of reflected light from the optical disc 2 goes to the high level, and the currents Ia, Ib, Ic, Id, $Is_1$ and $Is_2$ respectively go to the high level as shown in FIG. 4.

When the optical disc drive 1 is in the recording state and the output level of the laser beam is switched from the reproduction level to the recording level, the control means 9 lets the sample-and-hold circuit 8 operate to hold the voltages Va to $Vs_2$ immediately before the switching of the output level.

In this way, the voltages Va to $Vs_2$ immediately before the switching of the output level of the laser beam from the reproduction level to the recording level, are respectively held by the sample-and-hold circuit 8, and these voltages are then sent respectively to prescribed circuits.

At this time, the control means 9 switches the level of the control signals (voltages) for the changeover switches to the high level (Hi).

Further, as mentioned before, the voltage $V_{by}$ is sent from the optical pick-up 3 to a predetermined circuit and the current con is outputted from the optical pick-up 3 toward a circuit to which the reference voltage $V_{ref}$ is applied. In this state, no current flows in the main paths 231 to 236, as shown in FIG. 6.

Next, when the optical disc drive 1 is in the recording state and the output level of the laser beam goes again to the reproduction level for forming a land, the quantity of reflected light from the optical disc 2 goes to the low level, and the currents Ia, Ib, Ic, Id, $Is_1$ and $Is_2$ respectively go to the low level, as shown in FIG. 4.

At this time, the control means 9 switches the level of the control signals (voltages) f or the changeover switches to the low level (Lo).

Thereafter, as mentioned before, the voltages Va to $Vs_2$ are respectively outputted from the optical pick-up 3 to be inputted to the sample-and-hold circuit 8, and no current flows in the branch paths 237 and 238, as shown in FIG. 5.

In this way, when the optical disc drive 1 is in the recording state, and the output level of the laser beam irradiating the optical disc 2 switches from the recording level to the reproduction level, immediately after that, the control means 9 let the sample-and-hold circuit 8 operate not to hold the voltages Va to $Vs_2$.

As a result, the voltages Va to $Vs_2$ inputted to the sample-and-hold circuit 8 from the optical pick-up 3 simply pass through the circuit 8 to be sent to prescribed circuits.

Thereafter, when the optical disc drive 1 is in the recording state and the output level of the laser beam being projected to the optical disc 2 is switched alternately between the recording level and the reproduction level in that state, the system repeats the above-mentioned operations.

The case where the optical disc drive 1 goes to the reproduction state again, and the case where it goes to the recording state again, are respectively as described in the above, so further description about them will be omitted.

In this optical disc drive 1, various kinds of signal such as an HF (RF) signal, a tracking error signal, a focus error signal, a track loss signal (TLN signal) and a WOBBLE signal may be generated as needed, based on an arbitrary one of the voltages Va to $Vs_2$. These signals are utilized for specified controls during the recording or reproducing operation.

Moreover, in this optical disc drive 1, the voltage $V_{by}$ may be utilized for a prescribed control during the recording operation as needed.

As described in the above, according to the output control circuit (device) for the optical pick-up, when the output level of the laser beam being projected to the optical disc 2 is at the reproduction level, that is, when the quantity of reflected light from the optical disc 2 is at the low level, the currents from the photodiode 5 flow in the main paths. On the other hand, when the output level of the laser beam being projected to the optical disc 2 is at the recording level, that is, when the quantity of reflected light from the optical disc 2 is at the high level, the currents flow in the branch paths branched from the main paths via branching points. Therefore, it is possible to avoid the situation in which the dynamic ranges of respective current-voltage converting circuits 221 to 227 of the I-V amplifiers 6 are insufficiently narrow.

In particular, when the output level of the laser beam during the recording operation is at the reproduction level as well as during the recording operation, it is possible to obtain correct voltages Va to $Vs_2$ in response to the quantity of received light and with a relatively high level. As a result, it is possible to reliably perform various kinds of control during recording or reproducing operation, such as focus control, tracking control, track jump control (movement of the optical pick-up 3 to a target track) and decoding and the like.

Moreover, when the output level of the laser beam during the recording operation is at the recording level, voltage $V_{by}$ which has a relatively high level and correctly responsive to the quantity of received light can be obtained so that it is possible to utilize $V_{by}$ for a prescribed control during the recording operation.

Moreover, in this output control device for the optical pick-up, when the output level of the laser beam during the recording operation is at the recording level, currents from the split photodiode 5 flow in the branch paths. Accordingly, in each of the waveforms for the voltages Va to $Vs_2$, there is not formed a shape corresponding to the projection 34 which appears in the voltage $V_{by}$ as shown in FIG. 4. Because of this, in a circuit which generates a specified signal, for example, a circuit for generating an HF (RF) signal, a circuit for generating a tracking error signal, a circuit for generating focus error signal, a circuit for generating a track loss (TLN) signal, or a circuit for generating a WOBBLE signal, it is not necessary to separately provide a correction circuit for reducing or removing the adverse effect of the projection 34. As a result, the configuration of the circuit for generating such a specified signal can be simplified.

Moreover, since this output control device for the optical pick-up has the sample-and-hold circuit 8, it is possible to perform controls at the recording and reproduction operations more securely and reliably.

Moreover, in this output control device for the optical pick-up, the changeover switches 211 to 216 and the current-voltage converting circuits 221 to 227 are formed integrally, so that the number of part items can be reduced, and hence its assembly to the optical disc drive 1 can be facilitated.

Furthermore, since the changeover switches 211 to 216 and the current-voltage converting circuits 221 to 227 are formed integrally, the mounting area for electrical parts in the optical pick-up 3 can be made relatively small, which is advantageous for the miniaturization of the optical pick-up 3.

Next, a second embodiment of the output control device for the optical pick-up according to the present invention will be described.

Figure 7:
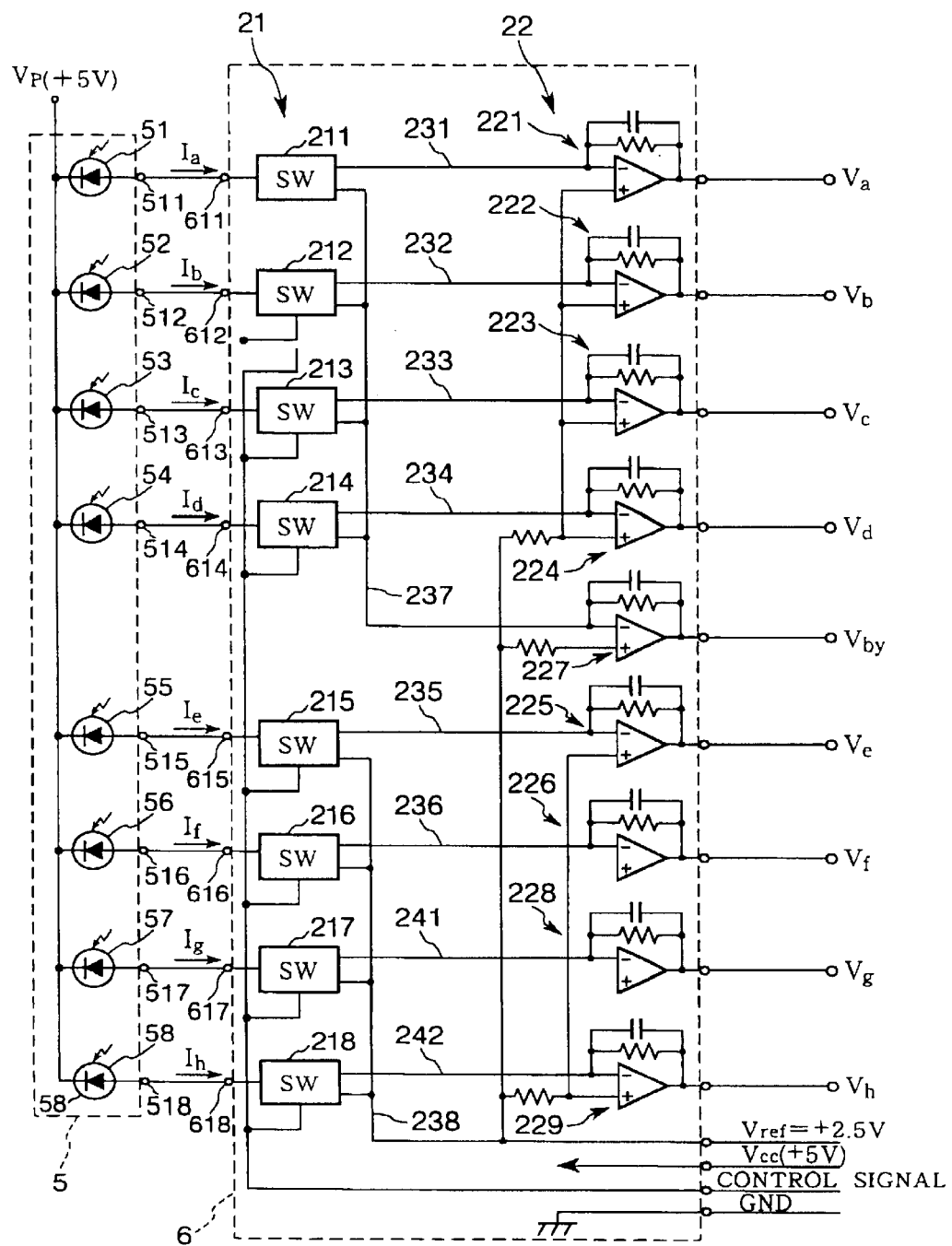
FIG. 7 is a circuit diagram which shows a second embodiment of the output control device for the optical pick-up according to the present invention.

FIG. 7 is a circuit diagram which shows the second embodiment. In the following description, the points in common with the first embodiment will be omitted, and only principal differences between them will be described.

As shown in the figure, in this output control circuit, the switching section (current supply changeover means) 21 of the I-V amplifier 6 is composed of eight changeover switches 211, 212, 213, 214, 215, 216, 217 and 218. Each of the changeover switches 211 to 218 is constructed from, for example, an analog switch.

The operation of each of the changeover switches 211 to 218 is controlled by a control signal from the control means 9.

The current-voltage converting means 22 is composed of first current-voltage converting and amplifying section comprised of eight first current-voltage converting circuits 221, 222, 223, 224, 225, 226, 228 and 229, and a second current-voltage converting and amplifying section comprised of a second current-voltage conversion circuit 227. In the following, the first and second current-voltage converting and amplifying sections will simply be referred to as current-voltage converting section, respectively.

Each of the current-voltage converting circuits 221 to 229 is composed of a differential amplifier equipped with an operational amplifier.

A reference voltage $V_{ref}$ of a predetermined level (for example, +2.5V) is applied to the non-inverting input terminal of each of the current-voltage converting circuits 221 to 229.

Various conditions such as the amplification factor for each of the current-voltage converting circuits 221 to 226, 228 and 229 are set so as to be able to convert a current outputted from a corresponding output terminal (light receiving region) of the split photodiode 5 into a voltage with necessary and sufficient level, when the output level of the laser beam being projected to the optical disc 2 is at the reproduction level (low level), that is, when the quantity of reflected light from the optical disc 2 is at the low level.

In this case, since the output level of the laser beam being projected to the optical disc 2 is at the reproduction level, the dynamic ranges of the current-voltage converting circuits 221 to 226, 228 and 229 are respectively sufficiently wide for the operation.

Moreover, the various conditions such as the amplification factor of the current-voltage converting circuit 227 are set so as to be able to convert the current outputted from the corresponding output terminal (light receiving region) of the split photodiode 6 correctly (with sufficient dynamic range) into a voltage, when the output level of the laser beam being projected to the optical disc 2 is at the recording level (high level), that is, when the quantity of reflected light from the optical disc 2 is at the high level.

In this case, since the output level of the laser beam being projected to the optical disc 2 is at the recording level, the current-voltage converting circuit 227 is capable of converting a current outputted from the corresponding output terminal (light receiving region) of the split photodiode 5 into a necessary and sufficient voltage.

The amplification factor of the current-voltage converting circuit 227 is set to be smaller than the amplification factors of the current-voltage converting circuits 221 to 226, 228 and 229.

In this output control circuit, the currents Ia, Ib, Ic, Id, Ie, If, Ig and Ih are outputted from the output terminals 511, 512, 513, 514, 515, 516, 517 and 518, respectively, and are inputted into the I-V amplifier 6 through the input terminals 611, 612, 613, 614, 615, 616, 617 and 618, respectively.

When the output level of the laser beam being projected to the optical disc 2 is switched to the reproduction level, the control means 9 switches the levels of the control signals (voltages) of the changeover switches to the low level (Lo).

Because of this, respective changeover switches 211 to 218 are switched so that the input terminal 611 (the output terminal 511) and the main path 231, the input terminal 612 (the output terminal 512) and the main path 232, the input terminal 613 (the output terminal 513) and the main path 233, the input terminal 614 (the output terminal 514) and the main path 234, the input terminal 615 (the output terminal 515) and the main path 235, the input terminal 616 (the output terminal 516) and the main path 236, the input terminal 617 (the output terminal 517) and a main path 241, and the input terminal 618 (the output terminal 518) and a main path 242 are in conductive state, respectively, and the input terminal 611 (the output terminal 511) and the branch path 237, the input terminal 612 (the output terminal 512) and the branch path 237, the Input terminal 613 (the output terminal 513) and the branch path 237, the input terminal 614 (the output terminal 514) and the branch path 237, the input terminal 615 (the output terminal 515) and the branch path 238, the input terminal 616 (the output terminal 516) and the branch path 238, the input terminal 617 (the output terminal 517) and the branch path 238, and the input terminal 618 (the output terminal 518) and the branch path 238 are in nonconductive state, respectively, as shown in FIG. 7.

As a result, the currents Ia to Ih are inputted to the current-voltage converting circuits 221 to 226, 228 and 229 through the main paths 231 to 236, 241 and 242, respectively.

Then, the currents Ia, Ib, Ic, Id, Ie, If, Ig and Ih are converted to voltages Va, Vb, Vc, Vd, Ve, Vf, Vg and Vh in the current-voltage converting circuits 221, 222, 223, 224, 225, 226, 228 and 229, respectively.

The voltages Va to Vh are outputted respectively from the I-V amplifier 6, that is, from the optical pick-up 3, and then are inputted to the sample-and-hold circuit 8.

In the meantime, since the input terminal 611 and the branch path 237, the input terminal 612 and the branch path 237, the input terminal 613 and the branch path 237, the input terminal 614 and the branch path 237, the input terminal 615 and the branch path 238, the input terminal 616 and the branch path 238, the input terminal 617 and the branch path 238, and the input terminal 618 and the branch path 238, are respectively in nonconductive state, no current flows in the branch paths 237 and 238.

When the output level of the laser beam being projected to the optical disc 2 is switched to the recording level, the control means 9 switches the level of the control signals (voltages) of the changeover switches to the high level (Hi).

As a result, respective changeover switches 211 to 218 are switched so that the input terminal 611 (the output terminal 511) and the main path 231, the input terminal 612 (the output terminal 512) and the main path 232, the input terminal 613 (the output terminal 513) and the main path 233, the input terminal 614 (the output terminal 514) and the main path 234, the input terminal 615 (the output terminal 515) and the main path 235, the input terminal 616 (the output terminal 516) and the main path 23 6, the input terminal 61 7 (the output terminal 517) and the main path 241, and the input terminal 618 (output terminal 518) and the main path 242 are in nonconductive state, respectively, and the input terminal 611 (the output terminal 511) and the branch path 237, the input terminal 612 (the output terminal 512) and the branch path 237, the input terminal 613 (the output terminal 513) and the branch path 237, the input terminal 614 (the output terminal 514) and the branch path 237, the input terminal 615 (the output terminal 515) and the branch path 238, the input terminal 616 (the output terminal 516) and the branch path 238, the input terminal 617 (the output terminal 517) and the branch path 238, and the input terminal 618 (the output terminal 518) and the branch path 238 are in conductive state, respectively.

Then, the currents Ia, Ib, Ic and Id are summed to $I_{by}$, and it is inputted to the current-voltage converting circuit 227 through the branch path 237.

The current $I_{by}$ is then converted into a voltage in the current-voltage converting circuit 227, and is outputted from the I-V amplifier 6, that is, from the optical pick-up 3, to be sent to a prescribed circuit.

Further, the currents Ie, If, Ig and Ih are summed to $Is_3$ and it is outputted from the I-V amplifier 6, that is, from the optical pick-up 3, through the branch path 238 to a circuit to be applied with the reference voltage $V_{ref}$.

In the meantime, since the input terminal 611 and the main path 231, the input terminal 612 and the main path 232, the input terminal 613 and the main path 233, the input terminal 614 and the main path 234, the input terminal 615 and the main path 235, the input terminal 616 and the main path 236, the input terminal 617 and the main path 241, and the input terminal 618 and the main path 242 are respectively in nonconductive state, no current flows in the main paths 231 to 236, 241 and 242.

With the output control device of this second embodiment, it is also possible to obtain an effect similar to that of the output control device of the first embodiment.

Next, a third embodiment of the output control circuit for the optical pick-up according to this invention will be described.

Figure 8:
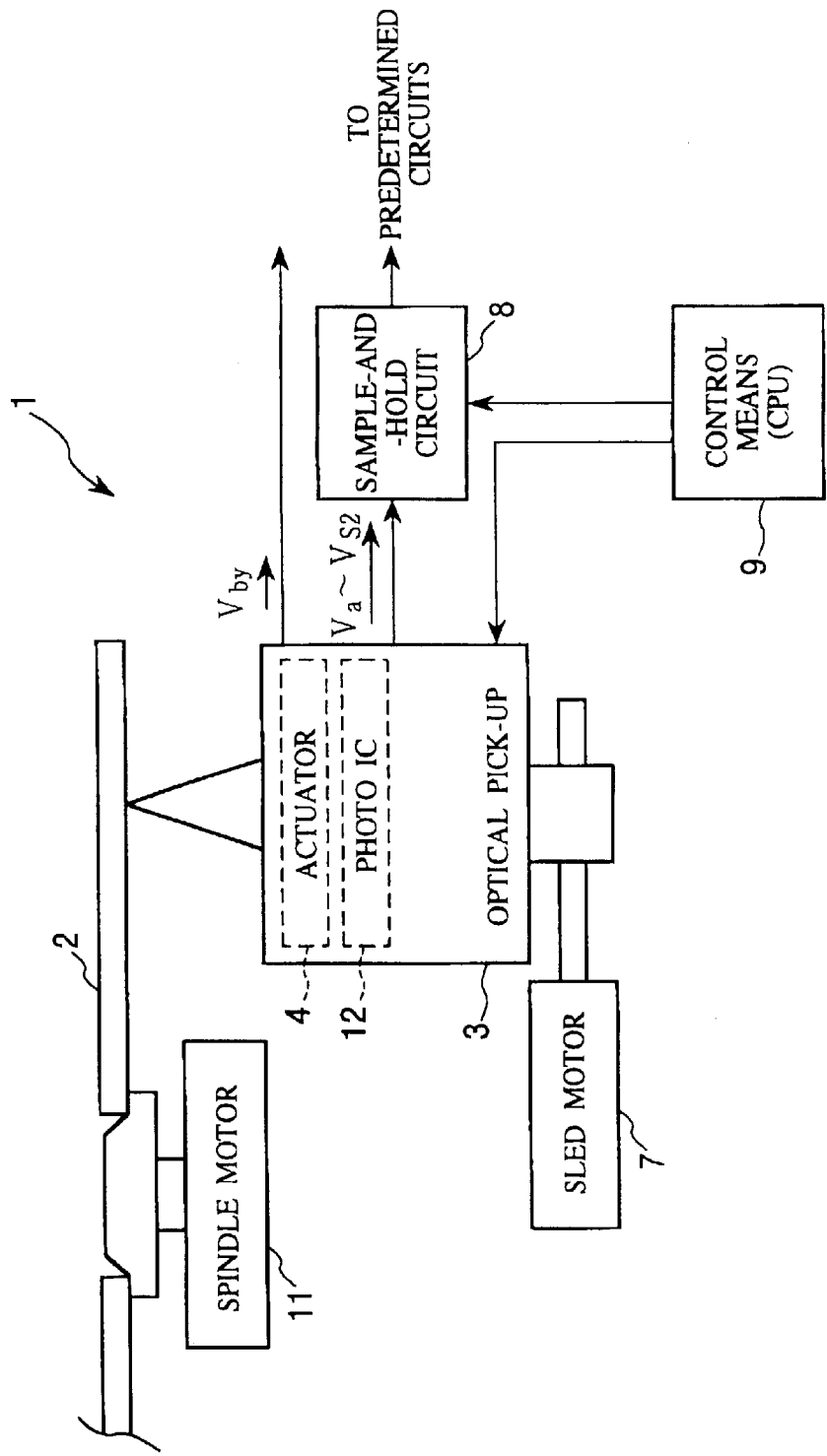
FIG. 8 is a block diagram which shows an example of a structure of a main portion of an optical disc drive according to the present invention.
Figure 9:
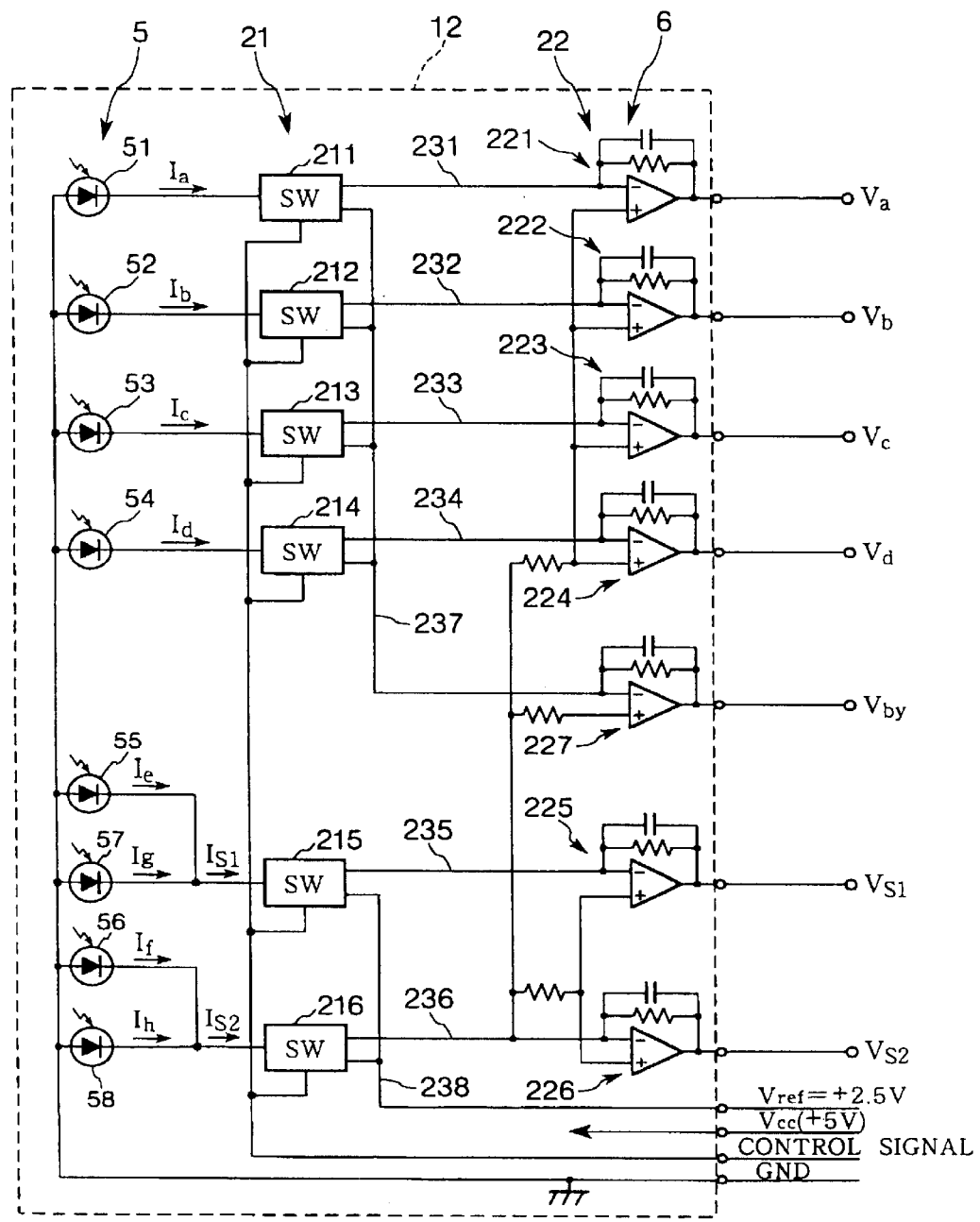
FIG. 9 is a circuit diagram which shows a third embodiment of the output control device for the optical pick-up according to the present invention.

FIG. 8 is a block diagram showing an example (principal part only) of the optical disc drive equipped with the output control device for the optical pick-up according to this invention, and FIG. 9 is a circuit diagram showing the third embodiment of the output control device for the optical pick-up of this invention. In the following description, the points in common with the first embodiment will be omitted, and only the principal differences from it will be described.

As shown by these drawings, this output control device has a photo IC 12 in which the split photodiode 5 and the I-V amplifier 6 are integrally incorporated. In this case, each anode of the split photodiode 5 is grounded.

With this output control device of the third embodiment, it is possible to obtain an effect similar to that of the output control circuit of the first embodiment.

Since the split photodiode 5 and the I-V amplifier 6 are integrally incorporated in this output control device, its assembly to the optical disc drive 1 is more facilitated and the electrical parts mounting area in the optical pick-up 3 is made smaller compared with the case of the first embodiment.

Next, a fourth embodiment of the output control device for the optical pick-up according to this invention will be described.

Figure 10:
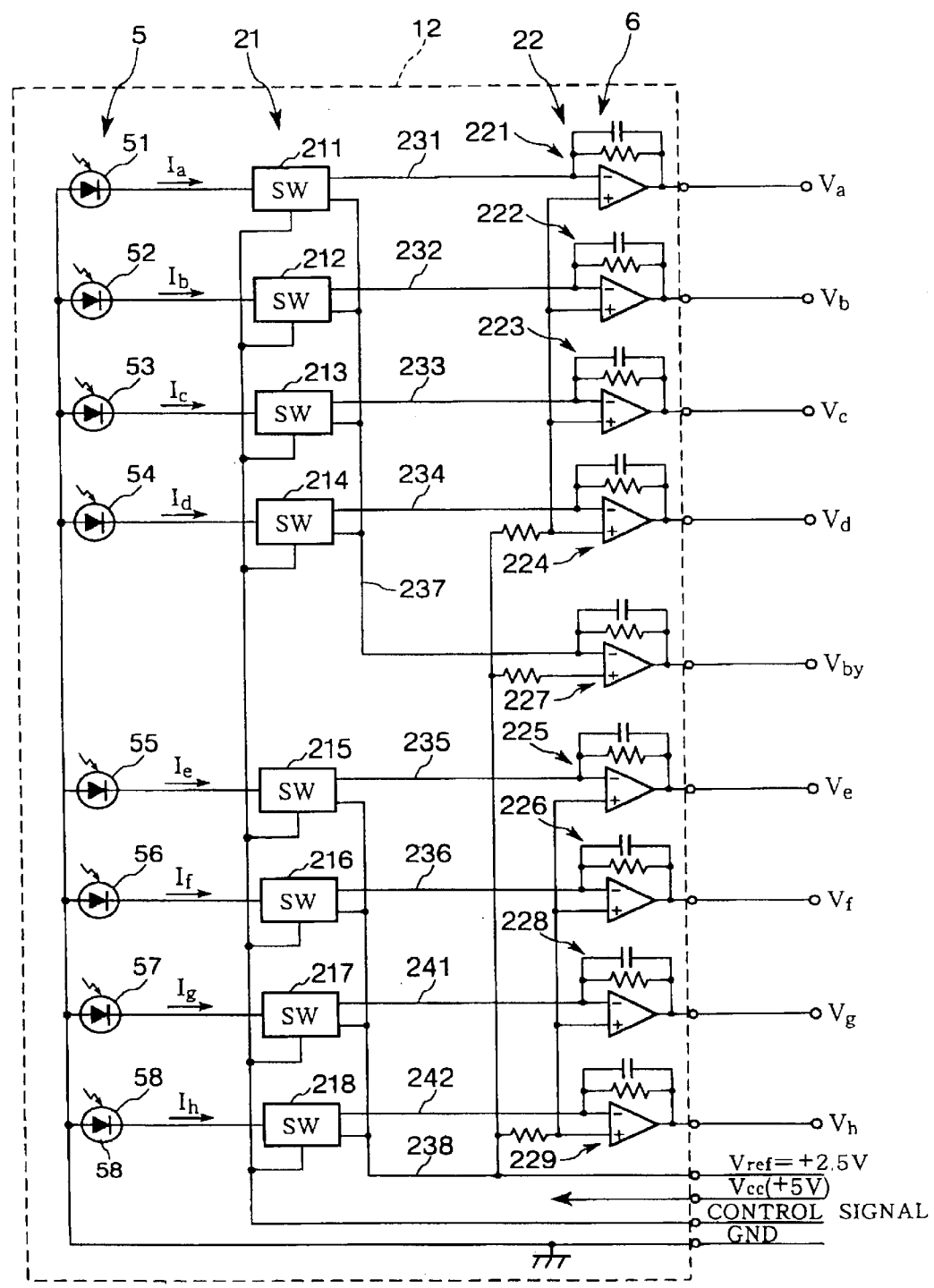
FIG. 10 is a circuit diagram which shows a fourth embodiment of the output control device for the optical pick-up according to the present invention.
Figure 11:
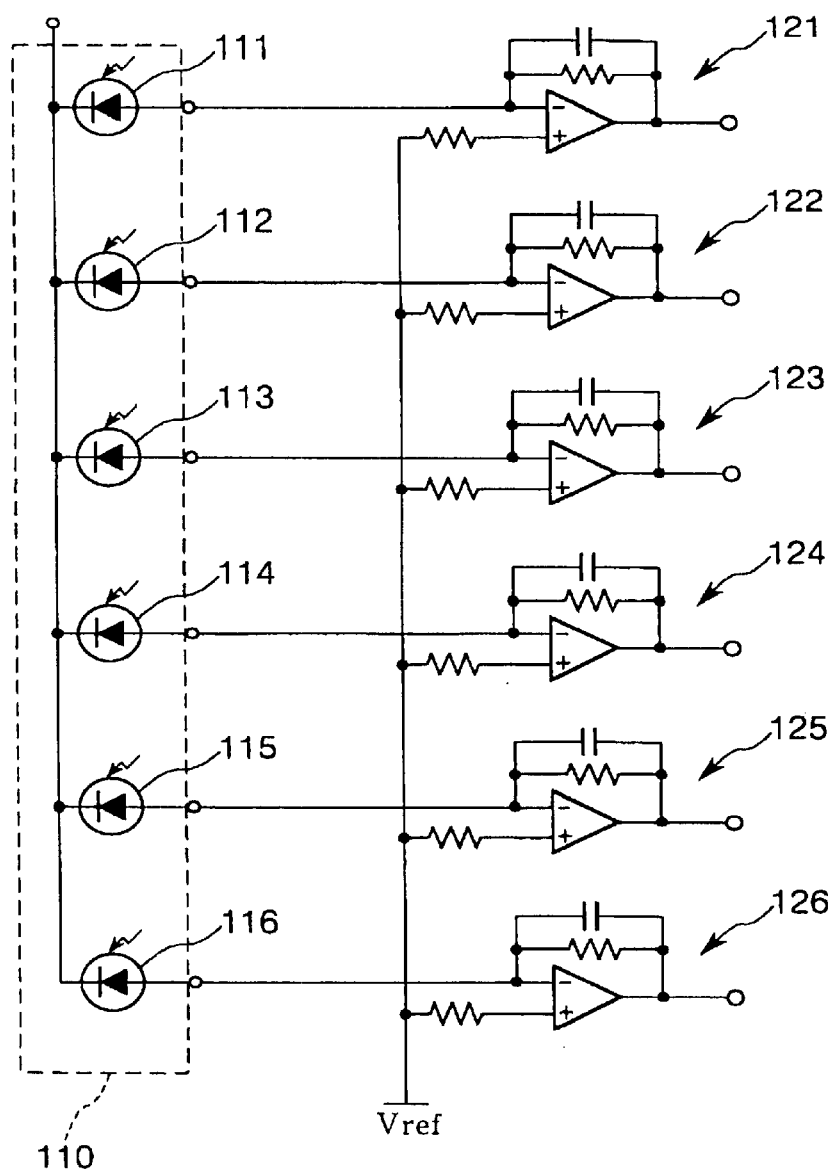
FIG. 11 is an illustration which shows a split photodiode and I-V amplifiers used in the conventional optical disc drive.

FIG. 10 is a circuit diagram showing the fourth embodiment of the output control device for the optical pick-up according to this invention. In the following, the points in common with the second embodiment will be omitted, and only the principal differences between them will be described.

As shown in this figure, this output control device also has a photo IC 12 in which the split photodiode 5 and the I-V amplifier 6 are integrally incorporated. In this case, each anode of the split photodiode is grounded.

With this fourth embodiment of the output control device, it is possible to obtain an effect similar to that of the second embodiment.

Since the split photodiode 5 and the I-V amplifier 6 are integrally incorporated in this output control device, its assembly to the optical disc drive 1 is more facilitated and the electrical parts mounting area in the optical pick-up 3 can be made smaller compared with the case of the second embodiment.

The application of the output control device for the optical pick-up according to this invention is not limited to the case as the output control device of the optical pickup for the CD-R drive described above. The output control device for the optical pick-up of the present invention can be used as the output control device for the optical pickup for other optical disc drives for recording and reproducing writable and readable optical discs (optical discs having a pregroove) such as CD-RW, DVD-R and DVD-RAM.

Further, the optical control device for the optical pick-up according to this invention may be applied to an output control device for an optical pick-up in various kinds of optical disc drives for recording and reproducing plural kinds of optical discs.

In the above, the optical control device for the optical pick-up according to this invention has been described in conjunction with the illustrated embodiments, but this invention is not limited to these cases only, and the configuration of various parts may be replaced by other configurations having similar functions.

For example, in this invention, the number of division, namely, the number of light receiving regions, of the split photodiode needs not be limited to 8, and it may be 7 or less, or 9 or more.

Moreover, in this invention, the light receiving part is not limited to a photodiode, and may be replaced with a phototransistor, for example.

Moreover, either one or both of the two sub-beams in this invention may be eliminated.

As described in the above, according to the output control device for the optical pick-up of this invention, it is possible to prevent insufficiency in the dynamic range of the current-voltage converting means such as I-V amplifier.

In particular, a voltage (signal) with a relatively high level and correctly responsive to the quantity of received light at the light receiving region can be obtained, thereby it is possible to reliably perform the controls during the recording and reproduction operations.

Moreover, when a sample-and-hold circuit which is capable of holding the voltages from the first current-voltage converting section is provided, it is possible to more reliably perform the controls during the recording and reproduction operations.

Finally, it is to be noted that any changes and modifications can be made without departing from the split of the invention, and therefore the scope of the invention is not limited to the embodiments described above and it will be determined only by the following claims.

What is claimed is:

1. An output control device for an optical pick-up used in an optical disc drive for reproducing and recording an optical disc, the optical pick-up being adapted to project light having a quantity of light of either high level for forming pits or low level for forming lands or reproducing the optical disk to the optical disc, the output control device comprising:

light receiving means having a plurality of light receiving regions for receiving reflected light from the optical disc and then outputting electrical currents responsive to the quantity of light received at the respective light receiving regions;

current-voltage converting means having a first current-voltage converting section for converting the currents supplied from the light receiving means into voltages through a predetermined amplification factor and a second current-voltage converting section for converting at least a part of the currents supplied from the light receiving means into voltages through a predetermined amplification factor which is lower than that of the first current-voltage converting section; and current supply changeover means having functions that supplies the current from the light receiving means to the first current-voltage converting section when the quantity of the reflected light from the optical disc is in the low level wherein the light has a quantity of light of the low level being projected, and that supplies at least a part of the currents from the light receiving means to the second current-voltage converting section without supplying the currents to the first current-voltage converting section when the quantity of the reflected light from the optical disc is in the high level wherein the light has a quantity of light of the high level being projected.

2. The output control device for an optical pick-up as claimed in claim 1, wherein the current supply changeover means comprises:

main paths for supplying the currents from the light receiving means to the first current-voltage converting means;

branch paths which are respectively branched from the main paths at respective branch portions for supplying the currents from the light receiving means to a part other than the first current-voltage converting section; and selection means for selecting either of the main paths or the branch paths to which the currents from the light receiving means are to be supplied, wherein the selection is made by the selection means so as to supply the currents from the light receiving means to the main paths when the quantity of reflected light from the optical disc is in the low level or so as to supply the currents from the light receiving means to the branch paths when the quantity of reflected light from the optical disc is in the high level.

3. The output control device for an optical pick-up as claimed in claim 2, wherein the light to be projected to the optical disc includes a main beam and sub-beams, and the branch path includes a first path connected to the second current-voltage converting section and a second path connected to a part other than the first and second current-voltage converting sections, in which the currents from the light receiving means corresponding to the main beam reflected from the optical disc are adapted to be supplied to the second current-voltage converting section through the first path when the quantity of light reflected from the optical disc is in the high level.

4. The output control device for an optical pick-up as claimed in claim 3, wherein the currents from the light receiving means corresponding to the sub-beams reflected from the optical disc are adapted to be outputted from the current-voltage converting means through the second path without passing through the first and second current-voltage converting sections.

5. The output control device for an optical pick-up as claimed in claim 2, wherein the selection means is constructed from a plurality of switches, and each of the switches is provided at each of the branch portions for selectively switching between the conducting state of the light receiving means and each of the main paths at the respective branch portions and the conducting state of the light receiving means and each of the branch paths at the respective branch portions.

6. The output control device for an optical pick-up as claimed in claim 1, further comprising a sample-and-hold circuit for holding voltages from the first current-voltage converting section when the quantity of light reflected from the optical disc is in the high level.

7. The output control device for an optical pick-up as claimed in claim 1, wherein the light receiving means, the current-voltage converting means and the current supply changeover means are integrally formed into a single unit.

8. A method for controlling output of an optical pick-up used in an optical disc drive for recording and reproducing an optical disc, the optical pick-up being adapted to project light having a quantity of light of either high level for forming pits or low level for forming lands or reproducing the optical disk to the optical disc, the method comprising the steps of:

receiving light reflected from the optical disc by light receiving means having a plurality of light receiving regions and then outputting electrical currents responsive to the quantity of reflected light at the respective light receiving regions; and supplying the currents from the light receiving means to a first current-voltage converting section having a predetermined amplification factor when the quantity of light reflected from the optical disc is in the low level wherein the light has a quantity of light of the low level being projected, while supplying at least a part of the currents from the light receiving means to a second current-voltage converting section having a predetermined amplification facto which is lower than that of the first current-voltage converting section without supplying the currents to the first current-voltage converting section when the quantity of light reflected from the optical disc is in the high level wherein the light has a quantity of light of the high level being projected.

9. The method for controlling output of an optical pick-up as claimed in claim 8, wherein the light to be projected to the optical disc includes a main beam and sub-beams, in which the currents from the light receiving means corresponding to the main beam reflected from the optical disc are adapted to be supplied to the second current-voltage converting section when the quantity of light reflected from the optical disc is in the high level.

10. The method for controlling output of an optical pick-up as claimed in claim 9, wherein the currents from the light receiving means corresponding to the sub-beams reflected from the optical disc are adapted to be outputted from the current-voltage converting means without passing through the first and second current-voltage converting sections.

* * * * *

UNITED STATES PATENT AND TRADEMARK OFFICE
CERTIFICATE OF CORRECTION

PATENT NO. : 6,424,609 B1
DATED : July 23, 2002
INVENTOR(S) : Masakado

It is certified that error appears in the above-identified patent and that said Letters Patent is hereby corrected as shown below:

Column 2,
Line 32, "case" should be -- cause --.
Line 34, "re producing" should be -- reproducing --.

Column 3,
Line 56, "convert in" should be -- converting --.

Column 5,
Line 1, "drive of the" should be -- drive --.
Line 8, "optical-pick up" should be -- optical pick-up --.

Column 7,
Line 4, "1516" should be -- 516 --.

Column 12,
Line 42, "con" should be -- $ls_3$ --.

Column 17,
Line 54, "division" should be -- divisions --.

Column 18,
Line 22, "disk" should be -- disc --.

Column 20,
Line 6, "disk" should be -- disc --.

Signed and Sealed this

Thirty-first Day of December, 2002

JAMES E. ROGAN
*Director of the United States Patent and Trademark Office*